Aug. 29, 1939.  F. H. GULLIKSEN  2,171,362
PHOTOCELL SYSTEM TO CONTROL SPACING OF TRAVELING ARTICLES
Filed May 6, 1938  4 Sheets-Sheet 1

INVENTOR
Finn H. Gulliksen.
BY Paul E. Friedemann
ATTORNEY

Aug. 29, 1939.   F. H. GULLIKSEN   2,171,362
PHOTOCELL SYSTEM TO CONTROL SPACING OF TRAVELING ARTICLES
Filed May 6, 1938   4 Sheets-Sheet 2

WITNESSES:
C. J. Weller.
Nw. C. Groome

INVENTOR
Finn H. Gulliksen.
BY
Paul E. Friedemann
ATTORNEY

Aug. 29, 1939.　　　F. H. GULLIKSEN　　　2,171,362
PHOTOCELL SYSTEM TO CONTROL SPACING OF TRAVELING ARTICLES
Filed May 6, 1938　　4 Sheets-Sheet 4

WITNESSES:

INVENTOR
Finn H. Gulliksen.
BY
Paul E. Friedemann
ATTORNEY

Patented Aug. 29, 1939

2,171,362

UNITED STATES PATENT OFFICE 2,171,362

PHOTOCELL SYSTEM TO CONTROL SPACING OF TRAVELING ARTICLES

Finn H. Gulliksen, Wilkinsburg, Pa., assignor to Westinghouse Electric & Manufacturing Company, East Pittsburgh, Pa., a corporation of Pennsylvania Application May 6, 1938, Serial No. 206,430

16 Claims. (Cl. 250—41.5)

My invention relates to photo-cell control systems and particularly to a system for controlling the spacing between certain articles or units that are to be supplied to a machine for treatment of the units.

One object of my invention is to provide a control system for controlling generally the rate of delivery of articles generally, and cardboard units, specifically, to a machine in which they are to be treated.

Another object of my invention is to provide a control system whereby the rate of delivery of certain articles as cardboard units, may be controlled to maintain a space between the successive articles or units.

Another object of my invention is to provide a photo-cell control system by means of which the units that are supplied to a machine for treatment will cooperate with the control system to enable the control system to regulate the rate of delivery of the units to the machine, and to regulate the delivery to maintain a space between the successive units.

In supplying cardboard units for example, to a machine which is to apply a cover to each cardboard, it is desirable to maintain a minimum space between successive cardboard units as they are delivered to the machine in order to permit the machine to properly handle each individual cardboard. Generally, such space will be equal to the corresponding dimension of the cardboard units.

In the system described herein, photo-electric devices are employed to detect the absence or presence of the minimum space between successive articles, specifically cardboard units. If there is such space between successive cardboard units that are about to enter the machine, those units are permitted to proceed without any imposed control. If the cardboard units are not separated by such space, however, the leader is permitted to move onward but the followers are retarded and held against motion until such space is introduced between the leader and the followers among the cardboard units.

Generally, the invention of this system involves two photo-cell assembly units spaced in the direction of movement of the cardboard units, and so located that each of the cardboard units, respectively, and sequentially, will intercept the two beams of light in sequence that are associated with the respective photo-cell assemblies. The spacing between the photo-cell assemblies in this case, is preferably made somewhat less than the shortest dimension to be encountered in the cardboard units in the direction of the path of travel. Thus it will be possible for one cardboard unit to intercept both light beams. The control equipment is set up to temporarily prevent forward movement of any cardboard unit except the leading unit when the second cell is lighted and when, immediately thereafter, both cells are dark by reason of the interception of both light beams. As soon as the first photo-cell is uncovered, the retarded follower cardboard units are released and permitted to move forward again toward the machine.

The general principle of one control system described herein involves the use of a photo-cell to control the potentials of the grid circuit of a tube. When the photo-cell is illuminated, a voltage of predetermined value and polarity is established between the grid element and the filament of the discharge tube and renders the tube conductive.

Two discharge tubes are used, and a separate photo-cell or photo-tube controls each discharge tube. One discharge tube controls a retarder to hold the follower units against forward motion while the leader unit moves forward. The other discharge tube controls a cut-off device to deenergize the retarder and to release the train of units to resume forward motion.

In a second control system described herein, both photo-cells are disposed as two arms in one bridge to constitute a photo-cell bridge. The galvanometer or unbalance detector of the photo-cell bridge is an electron tube which, in turn, constitutes one arm of a second or amplification bridge. This second bridge is unbalanced by the increase or by the decrease of the electron tube conductivity. The resultant unbalance voltage of the second bridge is selectively used, according to its quantity and polarity, to control either of two discharge tubes to accomplish the same type of control of a retarder and of a cut-off device as in the first system.

The manner in which the equipment of the two modifications of control circuits is applied is illustrated in the accompanying drawings, in which Figure 1 shows schematically the several positions, a to g, inclusive, of the cardboard units on the conveyor as they are controlled to establish a spacing between them, with the bottom portion of Fig. 1 showing a schematic side view of an arrangement of the conveyor belts;

Figure 1:
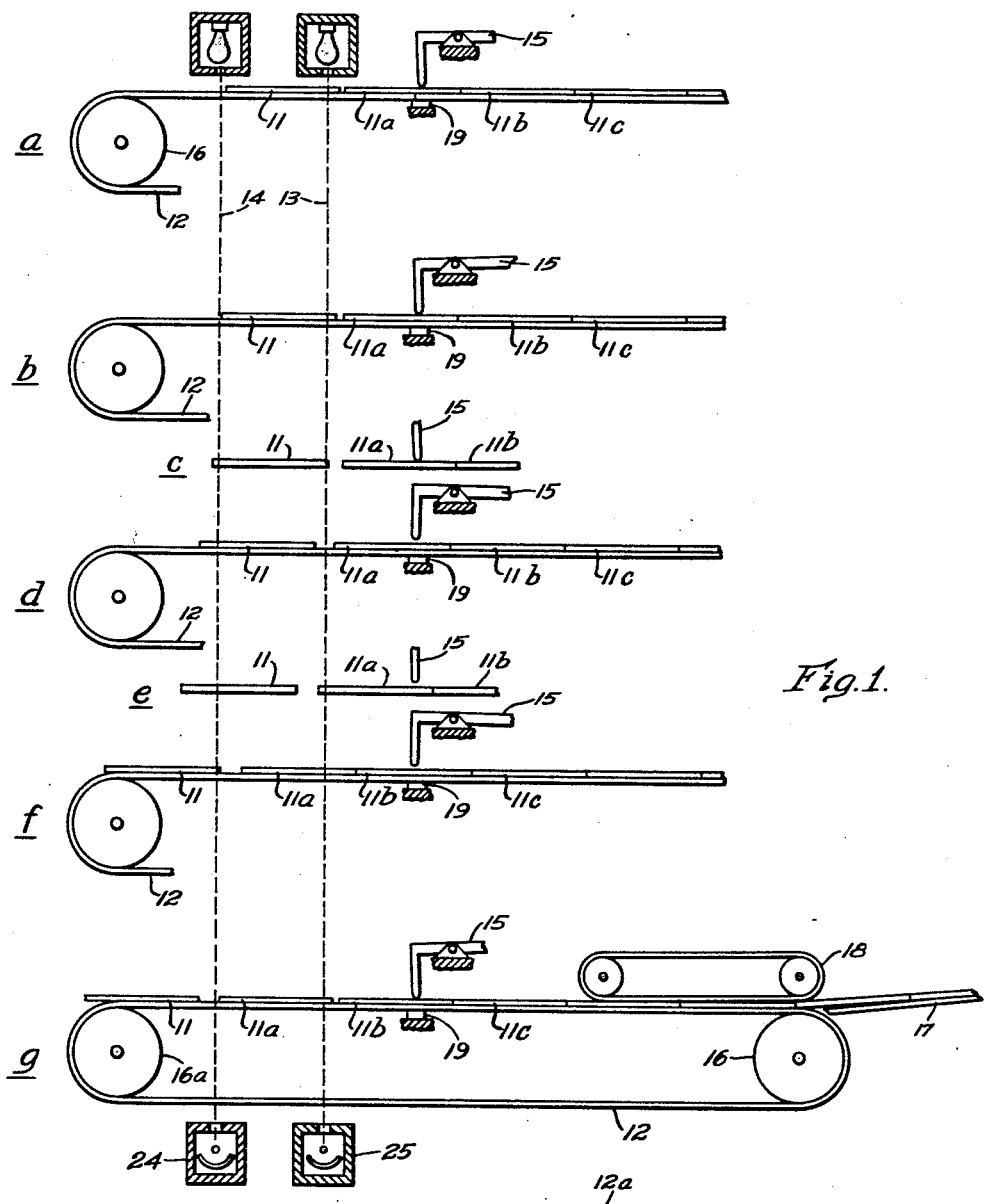

In Figure 1, I have illustrated, schematically, the sequence of operations of the retarding device, and the relative positions of articles such as cardboard units as correspondingly controlled by the retarder when it is actuated to establish a spacing between the successive cardboard units.

As illustrated in position $a$ of Fig. 1, a train of articles, such as cardboard units, including a leader 11 and followers 11a, 11b and 11c, etc., are shown moving along on a conveyor belt 12, from right to left, in a path where they will intercept two light beams 13 and 14 that control associated photo-cells 24 and 25. The light beams 13 and 14 are spaced along the path of travel a distance that is less than the width of one of the cardboard elements so that both light beams 13 and 14 may be intercepted by one cardboard element. The train of units is carried along by the conveyor belt 12 under a retarding device 15 as a pivoted arm, which is illustrated merely schematically in Fig. 1, adapted to press upon a cardboard unit directly beneath it. The retarding device should be located, as indicated, somewhat in advance of the first light beam 13 so that when the retarder is operated it will serve to hold the first follower unit 11a against forward motion while the leader unit 11 is being moved forward, thereby to introduce a space between the leader 11 and the follower 11a. Position $a$ shows the contacting or engaging relation between the leader 11 and the follower 11a just before the retarder 15 engages the follower 11a.

Position $b$ shows the relative position between the leader 11 and the follower 11a after the retarder has operated to prevent forward motion of the follower 11a, and after the leader has been moved forward in its travel a short distance but not sufficient to intercept the beam 14.

Position $c$ shows the spacing between the light beams to be less than the width of a cardboard unit.

Position $d$ shows the relative position of the leader 11 and the follower 11a after the leader 11 has, in its movement, intercepted both beams 13 and 14 and has then been advanced sufficiently to no longer intercept the beam 13, and thus to permit it to become effective again upon its associated photo-cell 25. When the photo-cell 25 becomes illuminated, the retarder 15 will be permitted to resume its raised or non-retarding position with respect to the follower 11a. The follower units will all then be released for forward actuation by the conveyor belt, together with the leader 11 so long as the leader unit 11 still intercepts the beam 14. As soon as the beam 14 is no longer intercepted by the leader 11, the retarder 15 will again be energized to its downward effective position to engage the new follower 11b, while the unit 11a is permitted to be moved forward by the conveyor belt. The transition is shown by positions $e$, $f$, and $g$.

The sequence of operations is controlled by each cardboard unit as it passes through the two light beams in sequence. When the beam 13 alone is free, the retarder will be deenergized. When the beam 14 alone is free, the retarder will be energized. Thus the trailing edge of a cardboard unit will control the deenergization of the retarder at beam 13, and will control the energization of the retarder at beam 14.

Thus as each unit leaves beam 14, it operates the retarder to hold the followers, and to permit the then leader to move ahead to establish a space between the leader and its follower. Position $d$ shows the spacing maintained between leader and follower after the retarder is raised. The follower intercepts beam 13 but nothing happens to intercept forward motion of the units. That action continues to the position $f$, where the leader is about to pass beyond light beam 14. Position $g$ shows the situation when beam 14 is no longer intercepted. The retarder is then operated to retard followers 11b, etc., while 11a is permitted to proceed as the then leader.

The entire sequence of operations will then be repeated as described above in order to introduce a space between each of the successive units in the sequence.

Figure 2:
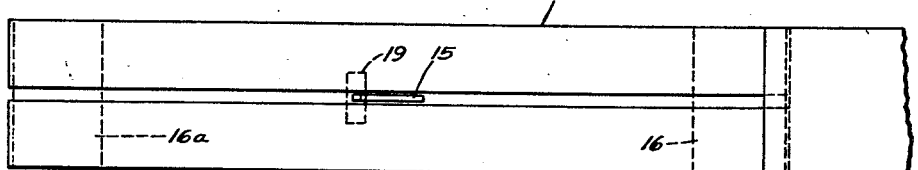
Fig. 2 is a schematic plan view of the main conveyor belt adjacent the retarding device.

With position $g$ there is also illustrated schematically the general arrangement of the conveyor belt 12 which is illustrated as a continuous belt operating around two spaced rollers 16 and 16a to convey the units from a feed table 17. An auxiliary belt 18 above the main conveyor is provided to prevent piling of the cardboard units and to assure that only one unit will be transmitted at a time. As illustrated in Fig. 1 and also in Fig. 2, the main conveyor belt 12 is shown as consisting, for example, of two sections 12 and 12a between which is mounted a stationary plate or platform 19 against which the retarder 15 may press a cardboard unit when the train of units is to be retarded.

Figure 3:
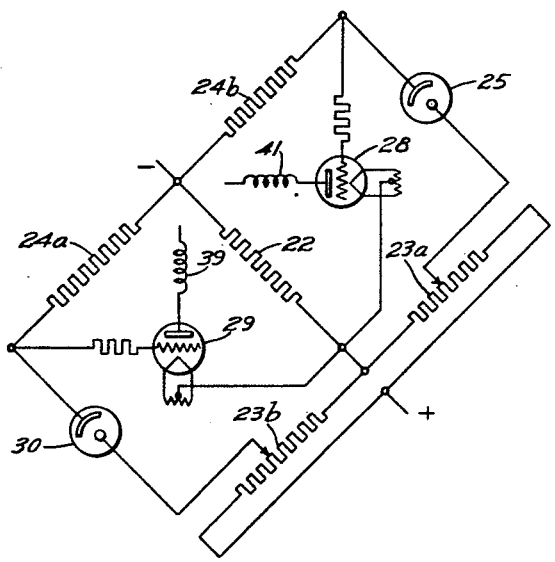
Fig. 3 is a diagrammatic simplified showing of part of the control circuit with its photo-cells and its discharge tubes in one of the control systems for the retarder.

In Fig. 3 is illustrated schematically a simple circuit showing how a photo-cell 25 controls the energization of its associated electric discharge tube 28. The photo-cell 25 is connected in series with a resistor 24b across a pair of resistors 22 and 23a connected to a source of voltage. By the resistor 23a, the potential of the grid of the discharge tube 28 may be adjusted to have a slight negative bias to block the operation of the tube 28 until the photo-cell 25 is illuminated. When the photo-cell is illuminated, the potential of the grid is changed to a more positive value beyond the critical operating potential of the tube and the tube becomes conductive. Photo-cell 30 is similarly connected in series with a resistor 24a across the pair of resistors 22 and 23b connected to a source of direct current.

As each of the photo-cells, in the arrangement in Fig. 3, is illuminated by a light beam from its associated source of light, the grid of the associated tube will be energized to render the associated discharge tube conductive.

Figure 5:
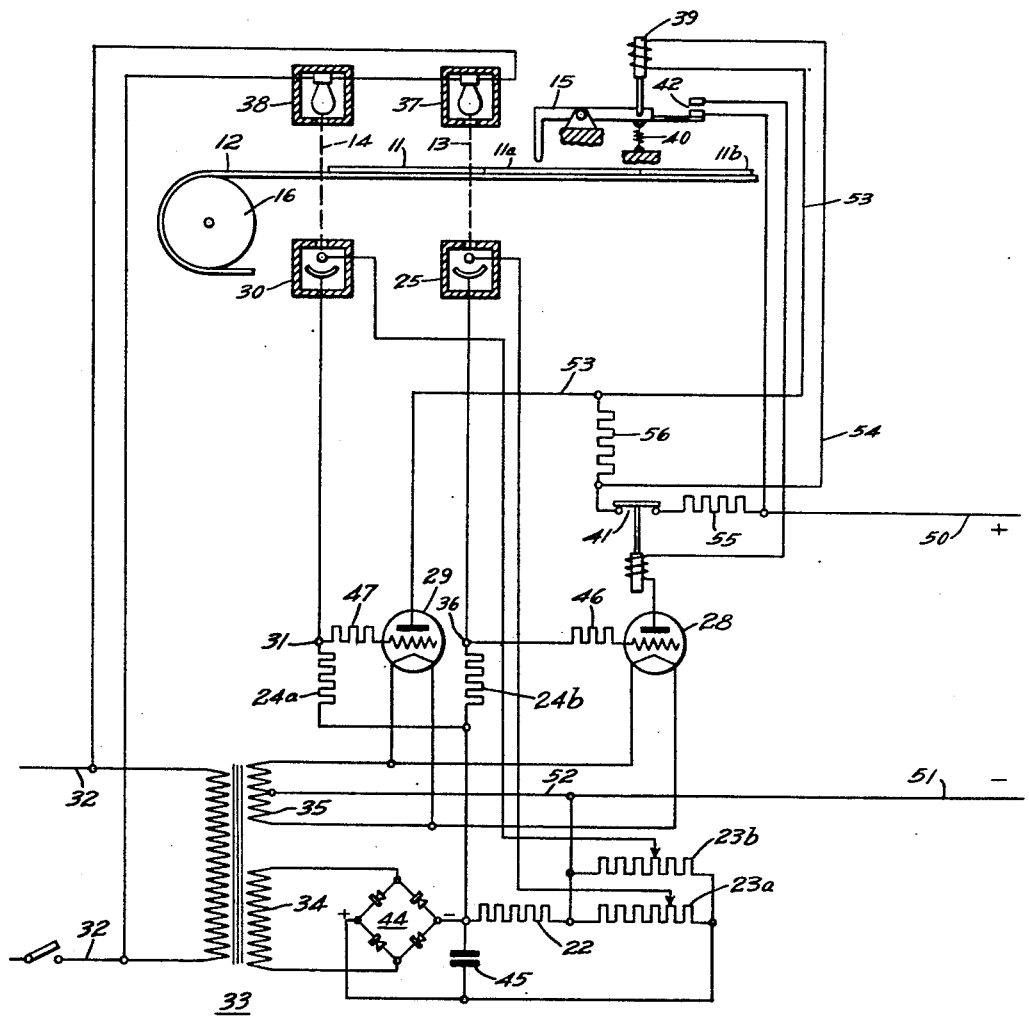
Fig. 5 is a diagrammatic showing of a complete circuit for the type of control system for the retarder shown in part in Fig. 3.

In the diagram of the complete system shown in Fig. 5, operating energy is derived from an alternating current supply circuit 32 through a transformer 33 that is provided with two secondary windings 34 and 35, respectively. Two photo-cells 25 and 30 are disposed in spaced relation along, and on one side of, the path of travel that is to be traversed by a series of cardboard units 11, 11a, 11b, etc. The light sources for the photo-tubes 25 and 30 are provided by two lamps 37 and 38 connected to be energized directly from the alternating current supply circuit 32. The lamps 37 and 38 are disposed on one side of the path to be traversed by the cardboard units 11, and the various elements are so arranged that the cardboard units will sequentially intercept the light beams 13 and 14 from the lamps 37 and 38, respectively, that are directed towards the photo-cells 25 and 30. The lamps and the photo-cells may be arranged, for example, as illustrated, with the lamps above the units and the photo-cells below the units.

The two photo-cells 25 and 30 are arranged to control the conductivity of two discharge tubes 28 and 29, respectively, each connected according to the showing in Fig. 3. The photo-cells control the potential of the grid element of the respective tubes with respect to the associated filament or cathode, as explained in reference to Fig. 3.

The two discharge tubes 28 and 29 cooperate to control the electromagnetic retarding device 15 to introduce a small space between the units.

Actuation of the retarder 15 is controlled by discharge tube 29 and is effected by means of a solenoid 39 acting against the force of a return biasing tension spring 40. In order to aid in restoring the retarder 15 to its neutral position, the circuit of the solenoid is opened by a cut-off relay 41 that is controlled by the other discharge tube 28. The retarder 15 is provided with a front contact switch 42 which serves, when closed and discharge 28 has become conducting, to set up an energizing circuit for the cut-off relay 41.

The input energy for the discharge tubes 28 and 29 is derived from the secondary windings 34 and 35 of the transformer 33. The winding 35 serves to heat and energize the cathode elements of the two tubes 28 and 29. The energy from the secondary winding 34 is rectified by a rectifier bridge 44, and is then supplied to the potentiometer resistors for the discharge tubes 28 and 29. One adjustable resistor 23a is provided for the circuit of photo-cell 25. Another adjustable resistor 23b is provided for the circuit of photo-cell 30. A condenser 45 is provided to absorb the ripples of the rectified current.

To limit the grid currents in the two tubes 28 and 29, the grid elements are provided with limiting resistors 46 and 47, respectively.

The output energy for the two discharge tubes 28 and 29 is derived from a direct current supply circuit 50. The negative conductor 51 is connected to a conductor 52 that is connected to a neutral or midpoint of the secondary winding 35 which is connected to the filaments of the discharge tubes. The output circuit of discharge tube 28 is the energizing circuit for the coil of the cut-off relay switch 41 and may be traced from the positive conductor of source 50 through switch 42 of the retarder, the operating coil of the electromagnetic cut-off relay 41, thence through the tube 28 to the negative conductor 51 of the direct current circuit 50.

The output circuit of the discharge tube 29 is the energizing circuit for the retarder 15, and may be traced from the positive conductor of source 50, through resistor 55, the contact members of the cut-off relay 41, conductor 54, coil 39, conductor 53, discharge tube 29 to the negative conductor 51 of the direct current circuit 50.

A resistor 56 is disposed to bridge the operating winding 39 of the retarder 15 in order to introduce a time delay in the deenergization of the winding 39, and consequently, to introduce a time delay in the opening of the switch contacts 42 that would deenergize the operating coil of cut-off relay 41.

The operation of the system of Fig. 5 may now be considered. Assume the filaments are heated as stated hereinbefore and that the other input circuits of the tubes are energized from rectifier 44. When photo-cell 25 is illuminated, the potential of the juncture point 36 connected to the grid of tube 28 becomes more positive and as hereinbefore stated, tube 28 becomes conductive. In a similar manner, a more positive grid potential of the tube 29 while the photo-cell 30 is illuminated renders the tube 29 conductive. By suitable adjustments of resistors 23a and 23b the initial or operating potentials of the grids of the two tubes may be selected.

Before any cardboard elements are intercepting the light beams, both photo-cells 25 and 30 remain illuminated, and retarder 15 will periodically be energized and deenergized, and will thus be vibrated at a frequency depending upon the constants of the dissipating circuit including resistor 56.

To start the system in operation, a leader cardboard unit should be placed in the position a shown in Fig. 1 to intercept beam 13 but not beam 14.

The spacing desired between successive units may be controlled and established by placing the leader unit so that its trailing edge will be behind the beam 13 a distance corresponding to the spacing desired.

As soon as the cardboard unit intercepts the beam 13 projected on the first photo-cell 25, the grid element of tube 28 will be negatively biased and will render the tube 28 non-conducting, and tube 28 will remain non-conducting as long as photo-cell 25 is dark. Consequently, cut-off relay 41 will remain deenergized for the same period of time. Since the beam 14 is effective, however, retarder 15 will be energized and will retard all the followers behind the leader 11. Leader unit 11 moves forward and proceeds to the light beam 14. Tube 29 remains conductive, however, until its circuit is opened since its output circuit is energized by direct current.

As the leader proceeds, its trailing edge permits light beam 13 to energize photo-cell 25. Tube 28 is then rendered conductive and cut-off relay 41 is energized since switch contact 42 of retarder 15 is closed. Cut-off relay 41 operates and opens the circuit of the retarder 15, which moves to its raised, non-effective position. The followers 11a, etc., are released for forward motion with a small space between trailing edge of leader 11 and leading edge of follower 11a.

The next cardboard unit 11a now intercepts the beam 13 to the photo-cell 25. The beam 14 to the photo-cell 30 is still intercepted by leader 11. As the trailing edge of leader 11 ceases to intercept beam 14, photo-cell 30 is reilluminated and the tube 29 is rendered conductive to reenergize the retarder winding 39. The retarder 15 will actuate to engage and retard the follower cardboard units 11b, 11c, etc., as shown in position g. The cardboard unit 11a will continue forward as moved by the conveyor means until it will intercept the beam 14 to the second phototube 30, and then will continue until beam 13 is no longer intercepted to re-expose the photo-cell 25, to energize the cut-off switch 41, and to deenergize the retarder to permit forward movement of the cardboard units again. The same sequence of operations just described occurs with each cardboard unit to thus ensure the spacing of the successive units as shown in positions *a* to *g* of Fig. 1.

Figure 4:
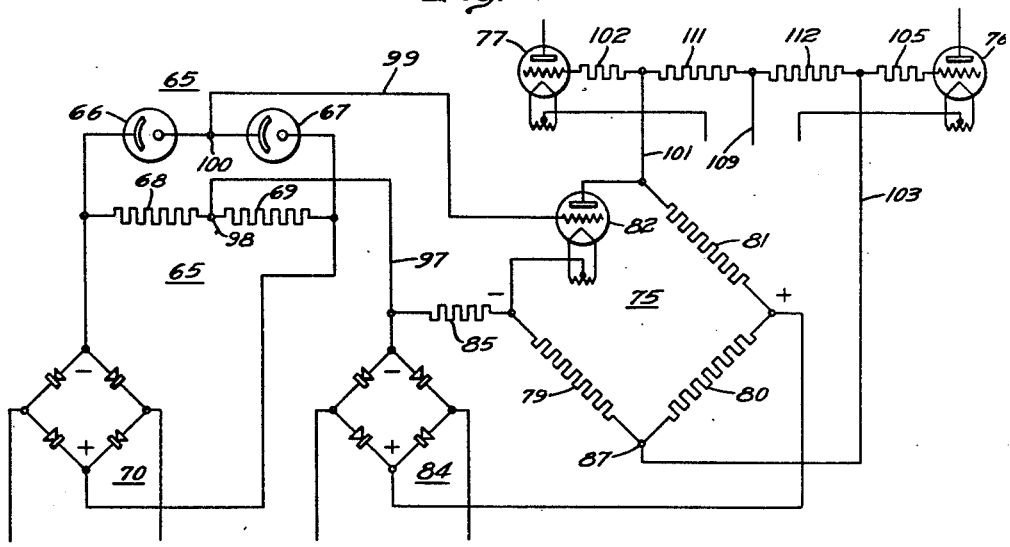
Fig. 4 is a diagrammatic simplified showing of part of a second control system for the retarder, employing a photo-cell bridge and an amplification bridge.

In the second control circuit to which I referred, I employ a different set of connections, as shown in the schematic diagram of Fig. 4.

The arrangement of Fig. 4 is preferably employed where the photo-cells may be energized for long periods of time without operation of the system, as where it may be undesirable to disconnect the system from its energizing circuit between operating intervals.

The arrangement in Fig. 4 comprises, briefly, a photo-cell bridge 65, including two photo-cells 66 and 67 on one side of the bridge, and two balanced resistor arm sections 68 and 69 on the other side of the bridge. A source of energy is schematically illustrated by a bridge 70 which is connected to a source of alternating current. The detector circuit of the photo-cell bridge 65 is employed to control a second bridge 75, which is employed as an amplification bridge between the photo-cells of bridge 65 and their associated discharge tubes 76 and 77.

The amplification bridge 75 comprises, generally, two resistor arms 79 and 80 on one side of the bridge, and a resistor arm 81 and an electron tube 82 on the other side of the bridge. The detector circuit of the photo-cell bridge 65 serves as the grid control circuit for the electron tube 82 in the amplification bridge 75. The amplification bridge is shown energized from a source indicated simply as a rectifier 84 to which the amplificaton bridge 75 is connected through a resistor 85.

When the amplification bridge 75 is normally balanced, the electron tube 82 conducts current of a given value, operating at an intermediate point on its operating curve. However, when the photo-cell bridge is unbalanced in one direction, or in the other, according to which photo-cell 66 or 67 is alone illuminated, the polarity of the unbalance voltage will be changed in the detector circuit of the photo-cell bridge. Such unbalance voltage will control the electron tube 82 to increase or to decrease the effective resistance of the electron tube in its arm of the amplification bridge 75. Consequently, the amplification bridge 75 will be unbalanced and the polarity of the unbalance voltage of bridge 75 will depend upon whether the effective resistance of the tube 82 was increased or decreased in the bridge 75.

The amplification bridge 75 then controls two discharge tubes 76 and 77 according to the polarity of the unbalance voltage of the amplification bridge. The two tubes 76 and 77 are thus controlled by the photo-cell bridge 65 to control the retarding device 15 and the cut-off relay 41 according to the sequence in which the photo-cells 66 and 67 are illuminated in the same manner as in the system previously described.

Figure 6:
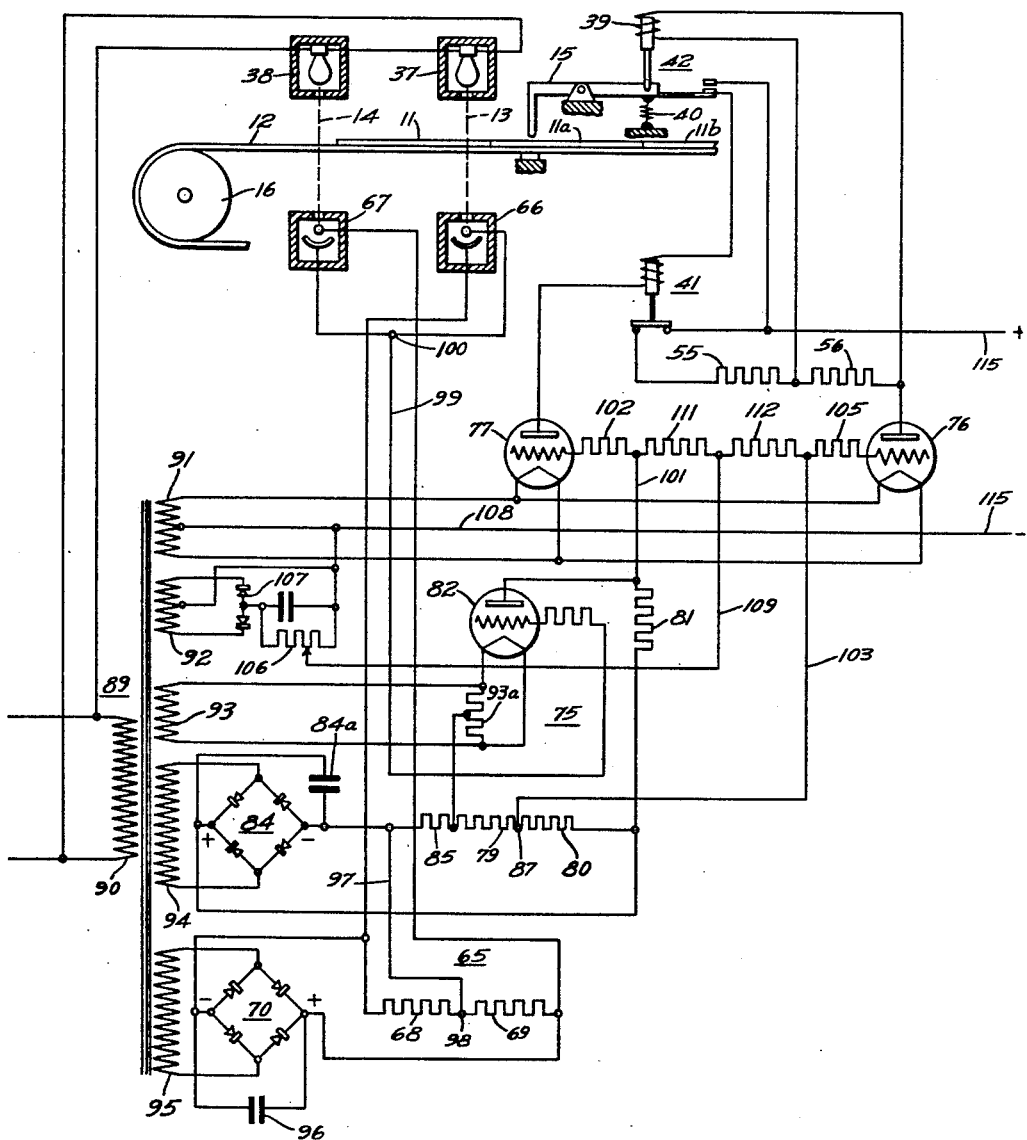
Fig. 6 is a diagrammatic showing of a complete circuit for a control system illustrated in part in Fig. 4.

In Fig. 6, I have illustrated a complete circuit diagram of a modified system to operate in accordance with the principles illustrated in the schematic arrangement shown in Fig. 4.

In the system shown in Fig. 6, the main transformer 89 is provided with a primary winding 90, and with five secondary windings numbered 91 to 95, respectively. Two photo-cells 66 and 67 are connected to the two resistors 68 and 69 to constitute a bridge that is energized from the secondary winding 95, through a full-wave rectifier 70. The photo-cell bridge is normally balanced electrically when both cells are light, or when both are dark, and the bridge will become unbalanced when the photo-cells are not both illuminated or both dark. A condenser 96 across the output circuit of the rectifier provides a short-circuiting path for the alternating current ripples from the rectifier 70.

The unbalance detecting element of the photo-cell bridge is provided by the three-element amplifying electron tube 82 in one arm of the second bridge 75. The filamentary cathode of amplifying tube 82 is heated by the secondary winding 93 of the transformer, and is provided with an external bridging resistor 93a to permit a mid-point connection to be made to the filament.

The amplifying bridge 75 comprises the electron tube 82 as one arm of the bridge, a potentiometer resistor as the two arms 79 and 80 of the bridge, and a resistor 81 as the fourth arm of the bridge. The amplifying bridge is energized from the transformer secondary 94 through a rectifier 84 and a resistor 85. A condenser 84a absorbs the ripples from the rectifier 84. The control circuit of the grid including the filament of electron tube 82, constitutes the galvanometer circuit for the photo-cell bridge 65.

The amplifying bridge in turn controls the two discharge tubes 76 and 77 by controlling the voltage and the polarity of the grid elements of those tubes. The grid element of tube 77 is connected to the plate of the tube 82 which constitutes one juncture of the amplifying bridge. The grid element of tube 76 is connected to the opposite juncture of the bridge, which is a terminal point 87 between resistor 79 and 80.

The unbalance circuit connection of the photo-cell bridge to the amplifying bridge consists of one conductor 99 from the juncture 100 between photo-cells 66 and 67 to the grid of tube 82; and of a second conductor 97 from the junctures 98 between the resistors 68 and 69 to the outer end of resistor 85 to introduce a bias voltage, corresponding to the drop across resistor 85, between the filament and the grid of the amplifying tube 82 in the amplifying bridge.

The unbalance circuit connection of the amplifying bridge consists of one conductor 101 from the plate of tube 82, which is the juncture point between the tube 82 and the resistor 81, to the grid of discharge tube 77 through a limiting resistor 102; and of a second conductor 103 from the juncture point 87, between resistors 79 and 80 of the amplification bridge, to the grid of discharge tube 76 through a limiting resistor 105.

The grid discharge tubes 76 and 77 are of a type that become conductive at and above a critical filament-to-plate voltage unless prevented by the grid potential relative to the filament. The grid may operate to initiate or to block conduction, according to the grid potential and polarity. Once the tube has been rendered conductive, however, the grid has no control power to terminate conduction, and the tube conductivity becomes self-sustaining until the main circuit of the tube is otherwise interrupted or the applied voltage reduced below conduction-sustaining value.

In order to provide an initial blocking bias to the grids of the discharge tubes 76 and 77, the voltage across part of a resistor 106, energized from the secondary 92 through a rectifier 107, is applied to the filaments of discharge tubes 76 and 77 through conductor 108, and is applied to the grids of the tubes through conductor 109 and the resistors 111 and 102, and 112 and 105.

The power circuit for the grid discharge tubes 76 and 77 consists of a direct current circuit 115, the negative conductor of which is connected to the mid-point of secondary transformer winding 91 to provide a connection to the filaments of the tubes 76 and 77.

The discharge tube 76 controls the circuit to the retarder as in the system shown in Fig. 5. The circuit proceeds from positive conductor of circuit 115, through back contact of relay 41, resistor 55, operating coil 39 of retarder 15, tube 76 to the negative conductor of circuit 115. A dissipating resistor 56 bridges the operating coil 39 of the retarder 15 to introduce a short time lag in resetting the retarder.

The other tube 77 controls the cut-off relay 41 and that circuit may be traced from the positive conductor of circuit 115 through contacts of switch 42 of the retarder, operating coil of relay 41, tube 77, to negative conductor of circuit 115.

To start the system, a cardboard is placed to intercept beam 13 but not beam 14, the latter being left effective. That cardboard unit becomes the leader 11, as in position a of Fig. 1.

While beam 13 is thus obstructed, and beam 14 free, the photo-cell bridge 65 is unbalanced and, consequently, the amplification bridge 75 is unbalanced to energize the grid of tube 76 to render that tube conductive. The retarder will be energized and leader unit 11 will move forward alone until it intercepts beam 14 also.

The photo-cell bridge 65 will be again balanced, and so will the amplifying bridge 75, while both beams 13 and 14 are intercepted. The conveyor belt will continue to move the leader 11, however, to establish a space between the leader and the stationary first follower until beam 13 is uncovered by the trailing edge of the leader 11.

The leader proceeds to the position shown by unit 11 in position d of Fig. 1, where beam 13 is no longer intercepted but beam 14 is still intercepted. Photo-cell bridge 65 is then unbalanced in the opposite direction, and energizes amplifier tube 82 in a direction to unbalance the amplifying bridge in the direction to energize tube 77. That tube becomes conductive and since the switch contacts 42 of the retarder 15 are closed, the circuit to the cut-off relay 41 is energized. Relay 41 operates and opens the circuit of the coil 39 of the retarder. The retarder coil is deenergized and the retarder returns to raised noneffective position. It opens its switch contact 42 and deenergizes cut-off relay 41. Cut-off relay 41 cannot now be energized again until the energizing circuit is reestablished by the retarder switch 42.

The cardboard units then proceed to the position f shown in Fig. 1, where the trailing edge of the leader unit is about to release the beam 14. The retarder is still up and the follower units moving with the conveyor belt. As soon as the leader moves on to permit illumination of photocell 67 by the beam 14, the photo-cell bridge is unbalanced, and, in turn, unbalances the second or amplifying bridge, reoperates the retarder, and the sequence outlined above continues.

While I have illustrated and specifically referred to cardboard units, obviously the system may be just as readily utilized to control the spacing between other devices.

My invention is, therefore, not limited to either specific arrangement of elements, as illustrated in the accompanying diagrams, since, as is herein illustrated, various arrangements or modifications may be resorted to, to establish the desired sequence of operations as herein described, without departing from the spirit and scope of the invention as set forth in the appended claims.

I claim as my invention:

1. A control system for controlling the rate of supply of cardboard comprising a first light source and a first photo-tube to be energized thereby; a second light source and a second photo-tube to be energized thereby, with the two photo-tubes and the light sources located in spaced relation with the light beams crossing a path to be traversed by traveling cardboard units; a feeding device to transfer the cardboard units past and through the light beams to the photo tubes, the spacing between the light beams being slightly less than the dimension of a cardboard unit measured in the direction of movement of the cardboard unit; means controlled by one photo tube for permitting forward movement of the cardboard units; and means controlled by the other photo-tube for preventing forward movement.

2. A control system for controlling the speed or frequency of supply of cardboard units to a machine, comprising a first photo-tube and light assembly; a second photo-tube and light assembly spaced therefrom in the path of travel by a distance slightly less than the dimension of a cardboard unit in the path of travel; and means responsive to the photo-tubes for controlling the cardboard units to establish a space between successive units.

3. A control system for controlling the speed or frequency of supply of cardboard units to a machine, comprising a first photo-tube and light assembly; a second photo-tube and light assembly spaced therefrom in the path of travel by a distance slightly less than the dimension of a cardboard unit in the path of travel; and means responsive to the photo-tubes for preventing forward movement of a follower cardboard unit until the leader has passed a predetermined distance from the follower.

4. A control system for controlling the speed or frequency of supply of cardboard units to a machine, comprising a first photo-tube and light assembly; a second photo-tube and light assembly spaced therefrom in the path of travel by a distance slightly less than the dimension of a cardboard unit in the path of travel; a retarding device for the cardboard units; and means controlled by the photo-tubes for controlling the retarding device according to the relative positions of the leader and the follower among the cardboard units.

5. An electronic control system for controlling the supply of a train of articles to a receiver so there will be a space between successive articles, comprising two photo-cell assemblies longitudinally spaced along the path of travel of the articles so the articles will intercept the energizing light beam to each photo-cell, means for controlling the speed of certain articles behind the leader in the train and means responsive to the photo-cells according to the position of the leading article relative to the photo-cells for controlling the speed-control means.

6. An electronic control system for controlling the supply of a train of articles to a receiver so that there will be a space between successive articles, comprising two photo-cell assemblies longitudinally spaced along the path of travel of the articles so the articles will intercept the energizing light beam to each photo-cell, means for controlling the speed of certain articles in the train behind the leader of the train, and means responsive to one of the photo-cells when the leader is spaced from the follower for nullifying this speed control means.

7. An electronic control system for controlling the supply of a train of articles to a receiver so there will be a space between successive articles, comprising two photo-cell assemblies longitudinally spaced along the path of travel of the articles so that the articles will intercept the energizing light beam to each photo-cell, means for retarding certain articles in the train behind the leading article, means for energizing the retarding means, and means responsive to the photo-cells according to the position of the leader relative to the photo-cells for deenergizing the retarding means.

8. An electronic control system for controlling the supply of a train of articles to a receiver so there will be a space between successive articles, comprising two photo-cell assemblies longitudinally spaced along the path of travel of the articles so that the articles will intercept the energizing light beam to each photo-cell, means for retarding certain articles in the train behind the leading article, an actuator for the retarding means, a cut-off for the retarding means, electronic means having grid control means for controlling the actuator and the cut-off, and a circuit controlled by the photo-cells to control the potential of the grid control means.

9. An electronic control system for controlling the supply of a train of articles to a receiver so that there will be a space between successive articles, comprising two photo-cell assemblies longitudinally spaced along the path of travel of the articles so that the articles will intercept the energizing light beam to each photo-cell, means for retarding certain articles in the train behind the leading article, an actuator for the retarding means, a cut-off for the retarding means, and energizing means controlled by the photo-cells for selectively energizing the actuator and the cut-off.

10. An electronic control system for controlling the supply of a train of articles to a receiver so that there will be a space between successive articles, comprising two photo-cell assemblies longitudinally spaced along the path of travel of the articles so that the articles will intercept the energizing light beam to each photo-cell, means for retarding certain articles in the train behind the leading article, an actuator for the retarding means, separate energizing means for the actuator and for the cut-off, and means selectively controlled by the photo-cells for controlling the energizing means.

11. An electronic control system for controlling the supply of a train of articles to a receiver so that there will be a space between successive articles, comprising two photo-cell assemblies longitudinally spaced along the path of travel of the articles so that the articles will intercept the energizing light beam to each photo-cell, means for retarding certain articles in the train behind the leading article, an actuator for the retarding means, a cut-off for the retarding means, electronic means for selectively energizing the actuator or the cut-off, and means electrically cooperative with the photo-cells for controlling the electronic means.

12. An electronic control system for controlling the supply of a train of articles to a receiver so that there will be a space between successive articles, comprising two photo-cell assemblies longitudinally spaced along the path of travel of the articles so that the articles will intercept the energizing light beam to each photo-cell, means for retarding certain articles in the train behind the leading article, an actuator for the retarding means, a cut-off for the retarding means, energizing means for the actuator and for the cut-off, and interlocking means between the actuator and the cut-off.

13. An electronic control system for controlling the supply of a train of articles to a receiver so that there will be a space between successive articles, comprising two photo-cell assemblies longitudinally spaced along the path of travel of the articles so that the articles will intercept the energizing light beam to each photo-cell, means for retarding certain articles in the train behind the leading article, and means controlled by the first photo-cell, when the cell is re-exposed by forward motion of the leader article, to nullify the retarding means.

14. An electronic control system for controlling the supply of a train of articles to a receiver so that there will be a space between successive articles, comprising two photo-cell assemblies longitudinally spaced along the path of travel of the articles so that the articles will intercept the energizing light beam to each photo-cell, means for retarding the certain articles in the train behind the leading article, an electronic valve to supply energy to the retarding means, a cut-off for the retarding means, an electronic valve to supply energy to the cut-off, and a network circuit controlled by the photo-cells to control the conductivity of the electronic valves.

15. An electronic control system for controlling the supply of a train of articles to a receiver so that there will be a space between successive articles, comprising two photo-cell assemblies longitudinally spaced along the path of travel of the articles so that the articles will intercept the energizing light beam to each photo-cell, means for retarding certain articles in the train behind the leading article, an electronic valve to supply energy to the retarding means, a cut-off for the retarding means, an electronic valve to supply energy to the cut-off, and means responsive to a condition of the photo-cells indicating a spaced relation between leader and follower for controlling the electronic valve to the cut-off.

16. An electronic control system for controlling the supply of a train of articles to a receiver so there will be a space between successive articles, comprising two photo-cell assemblies longitudinally spaced along the path of travel of the articles so that the articles will intercept the energizing light beam to each photo-cell, means for retarding certain articles in the train behind the leading article, an electronic valve to supply energy to the retarding means, a cut-off for the retarding means, an electronic valve to supply energy to the cut-off, and means responsive to the photo-cells when the first photo-cell in the path of the units is exposed and the second photo-cell covered, for controlling the electronic valve to the cut-off to energize the cut-off.

FINN H. GULLIKSEN.